Jan. 3, 1961  J. MUELLER  2,967,066
INDIVIDUAL VEHICLE WHEEL SUSPENSION
Filed Feb. 9, 1959
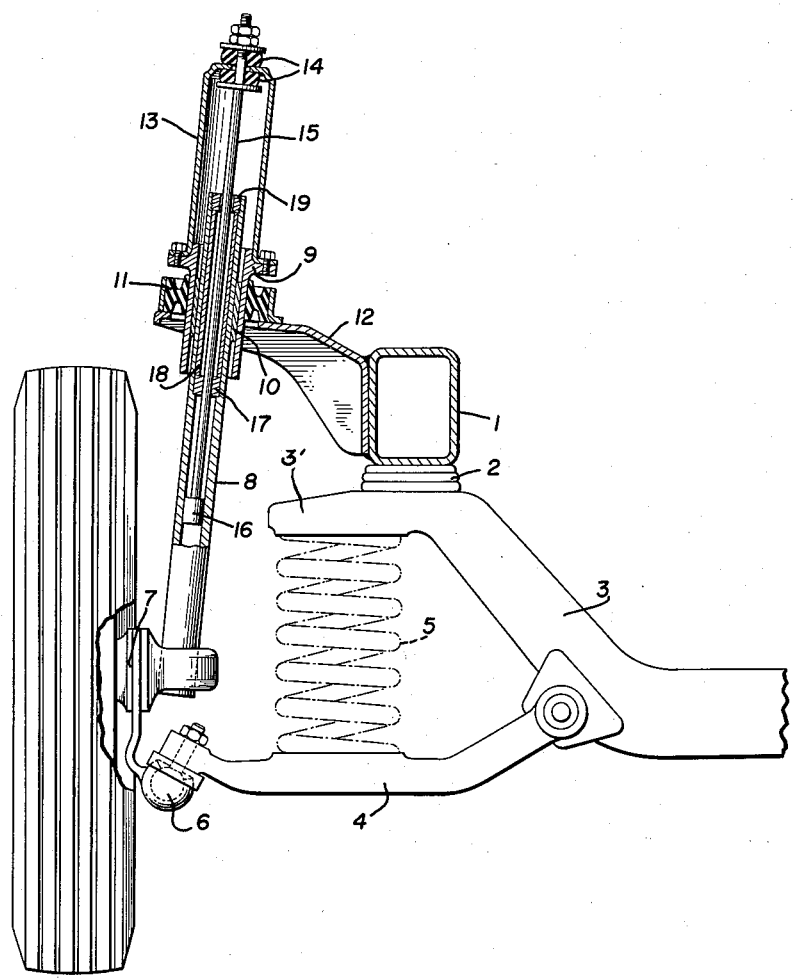
INVENTOR.
JOSEF MÜELLER
BY
*Dicke, Craig & Freudenberg*
ATTORNEYS

United States Patent Office 2,967,066
Patented Jan. 3, 1961

2,967,066

INDIVIDUAL VEHICLE WHEEL SUSPENSION

Josef Mueller, Stuttgart-Riedenberg, Germany, assignor to Daimler-Benz Aktiengesellschaft, Stuttgart-Unterturkheim, Germany Filed Feb. 9, 1959, Ser. No. 792,069

Claims priority, application Germany Feb. 15, 1958

5 Claims. (Cl. 280—124)

The present invention relates to an individual wheel suspension for vehicles, especially motor vehicles, provided with guide means of the axle spindle or steering knuckle by means of a transverse guide member and with a sliding guide means combined with a shock absorber in which a shock absorber piston is slidingly arranged within a tubular member rigidly connected with the axle shaft or steering knuckle and forming a part of the sliding guide means.

In the known constructions of this type of the prior art, the sliding guide means takes place at two places, namely, in the first place, between the tubular member and the shock absorber piston, and, in the second place, between the tubular member and the shock-absorber piston rod. The piston rod is thereby pivotally secured with the upper end thereof at the vehicle frame, chassis, or body of a self-supporting structure or at an analogous part. This arrangement leads readily to relatively large frictional resistances during spring movements and to locking or jamming of the parts by reason of the twofold or double sliding guide arrangement thereof, by reason of the changing distance between the guiding places and by reason of the relatively large distance of the pivot point of the piston rod from the pivotal connection of the transverse guide member at the axle spindle or wheel carrier. Furthermore, in case of breakdowns or troubles necessitating repairs in the shock absorber, the entire wheel suspension has to be always disassembled in such prior art constructions.

In contrast thereto, it is proposed in accordance with the present invention to provide a sliding guide arrangement between the tubular member and a sleeve member surrounding the same on the outside thereof which sleeve member is secured within the area of the sliding surface for the sliding guide means at the vehicle with joint means to provide universal movement thereof and on which is supported the rod retaining the shock absorber piston.

In particular, the construction in accordance with the present invention may be so arranged that a bell-shaped member is detachably secured at the sleeve member whereby the shock-absorber piston rod is supported, preferably elastically, at the upper end of the bell-shaped member. The sleeve member is advantageously secured at the vehicle frame or superstructure with the aid of a rubber joint to permit essentially universal movement thereof with respect to the vehicle frame or superstructure.

In that manner, the guide means in accordance with the present invention occurs always at the same single place, and this one place is not too far from the pivotal connection of the cross guide member. The shock-absorber may be readily disassembled thereby without impairing the wheel suspension, properly speaking, so that the vehicle does not need to be jacked up for that purpose. For that reason, it is also proposed in accordance with the present invention that the wheel spring acts against the transverse guide member and not, for example, between the tubular member and the bell-shaped member which would also entail as consequence the disadvantage of a requirement for a very heavy construction of the bell-shaped member and the frame part carrying the sleeve member.

Accordingly, it is an object of the present invention to provide an individual wheel suspension for motor vehicles which obviates the disadvantages of the prior art and which provides a simple, light-weight, and compact wheel suspension in which a sliding guide arrangement is combined with the shock-absorber.

Another object of the present invention is the provision of an individual wheel suspension utilizing a sliding guide system combined with the shock-absorber of the wheel suspension in which the place for guiding the various parts in their sliding movements remains in the same relative locations and in which the pivotal connection between the various parts thereof, particularly with respect to the pivotal connection of the transverse guide member, is not excessive.

Still another object of the present invention is the provision of an individual wheel suspension utilizing a sliding guide arrangement combined with a shock absorber in which the shock absorber may be readily disassembled for purposes of repair without requiring disassembly of the wheel suspension properly speaking.

These and other objects, features and advantages of the present invention will become more obvious from the following description when taken in connection with the accompanying drawing which shows, in the single view thereof, one embodiment illustrative of the present invention.

Referring now to the drawing, which shows in the single view thereof a front view of one vehicle side provided with a wheel suspension in accordance with the present invention with certain parts thereof being shown in cross section to illustrate the details thereof, reference numeral 1 designates therein the vehicle longitudinal bearer member. A cross bearer member 3 is suitably connected with the longitudinal bearer member 1 by the interposition, for example, of a rubber buffer 2 or the like. A transverse guide member or arm 4 of suitable construction is pivotally connected at the cross bearer member 3 while a coil spring 5 spring-supporting the wheel is appropriately interposed between the transverse guide member 4 and a bracket-like extension 3' of the cross bearer member 3. A ball joint 6 of suitable construction operatively connects the transverse guide member 4 with the axle spindle 7 which may be of any suitable construction. A tubular member 8 is rigidly connected in any suitable manner with the axle spindle 7. A sleeve member 9 surrounds the tubular member 8 and carries a sliding-bearing bushing 10. The sleeve member 9 is supported in a rubber ring 11 to enable limited universal movement of sleeve member 9 with respect to the bracket 12 which suitably retains the rubber ring 11 and is itself rigidly connected with the longitudinal bearer member 1, for example, by welding or in any other suitable manner. A bell-shaped member 13 is threadedly secured, for example, by means of a plurality of bolts and nuts, to the sleeve member 9 while the piston rod 15 for the shock-absorber piston 16 is elastically supported at the bell-shaped member 13 in the top part thereof by the interposition of rubber elements 14.

The pressure space of the hydraulic shock absorber disposed above the piston 16 is suitably closed off by a plug member 17 which is forced by a threaded member 19 acting through a bushing 18 against the collar portion formed within the tubular member 8 and is thus secured in its assembled position.

The valves, as well as the other details of the shock absorber, which may be of any suitable conventional construction, are not shown in the drawing for purposes of clarity thereof.

It may be readily seen from the drawing that the shock-absorber piston 16, after removal of the bell-shaped member 13 from the piston rod 15 and the sleeve member 9 and after removal of the threaded member 19 may be readily disassembled without in any way impairing or affecting the wheel suspension as such.

While I have shown and described one embodiment in accordance with the present invention, it is understood that the same is not limited thereto but is susceptible of many changes and modifications within the spirit and scope of the present invention, and I, therefore, do not wish to be limited to the details illustrated and described herein but intend to cover all such changes and modifications as are encompassed by the scope of the appended claims.

I claim:

1. An individual wheel suspension for vehicles, particularly motor vehicles provided with spindle means for supporting thereon the vehicle wheel and with a relatively stationary vehicle part, comprising essentially transversely extending guide means for guidingly securing said axle spindle means at said relatively stationary part, tubular means secured to said axle spindle means, shock-absorber piston means slidingly arranged within said tubular means and including a shock-absorber piston rod, and means providing a sliding surface for slidingly guiding the shock absorber formed by said tubular means and said piston means with respect to said relatively stationary vehicle part including sleeve means surrounding said tubular means, means securing said sleeve means at said relatively stationary vehicle part to provide a universal movement thereof within the region of said sliding surface, and means supporting said shock-absorber piston rod at said sleeve means, said sleeve means including a sleeve member surrounding said tubular means and a bell-shaped member detachably secured to said sleeve member, said shock-absorber piston rod being supported at the upper end of said bell-shaped member.

2. An individual wheel suspension for vehicles, particularly motor vehicles provided with spindle means for supporting thereon the vehicle wheel and with a relatively stationary vehicle part, comprising essentially transversely extending guide means for guidingly securing said axle spindle means at said relatively stationary part, tubular means secured to said axle spindle means, shock-absorber piston means slidingly arranged within said tubular means and including a shock-absorber piston rod, and means providing a sliding surface for slidingly guiding the shock absorber formed by said tubular means and said piston means with respect to said relatively stationary vehicle part including sleeve means surrounding said tubular means, means securing said sleeve means at said relatively stationary vehicle part to provide a universal movement thereof within the region of said sliding surface, and means supporting said shock-absorber piston rod at said sleeve means, said sleeve means including a sleeve member surrounding said tubular means and a bell-shaped member detachably secured to said sleeve member, said shock-absorber piston rod being supported at the upper end of said bell-shaped member, said supporting means elastically supporting said piston rod at the upper end of said bell-shaped member.

3. An individual wheel suspension for vehicles, particularly motor vehicles provided with spindle means for supporting thereon the vehicle wheel and with a relatively stationary vehicle part, comprising essentially transversely extending guide means for guidingly securing said axle spindle means at said relatively stationary part, tubular means secured to said axle spindle means, shock-absorber piston means slidingly arranged within said tubular means and including a shock-absorber piston rod, and means providing a sliding surface for slidingly guiding the shock absorber formed by said tubular means and said piston means with respect to said relatively stationary vehicle part including sleeve means surrounding said tubular means, means securing said sleeve means at said relatively stationary vehicle part to provide a universal movement thereof within the region of said sliding surface, and means supporting said shock-absorber piston rod at said sleeve means, said sleeve means including a sleeve member surrounding said tubular means and a bell-shaped member detachably secured to said sleeve member, said shock-absorber piston rod being supported at the upper end of said bell-shaped member, said supporting means elastically supporting said piston rod at the upper end of said bell-shaped member, said securing means including rubber joint means for elastically supporting said sleeve means at said relatively stationary part.

4. An individual wheel suspension for vehicles, particularly motor vehicles provided with spindle means for supporting thereon the vehicle wheel and with a relatively stationary vehicle part, comprising essentially transversely extending guide means for guidingly securing said axle spindle means at said relatively stationary part, tubular means secured to said axle spindle means, shock absorber piston means slidingly arranged within said tubular means and including a shock-absorber piston rod, and means for slidingly guiding the shock absorber formed by said tubular means and said piston means with respect to said relatively stationary vehicle part including sleeve means surrounding said tubular means, means securing said sleeve means at said relatively stationary vehicle part to provide a universal movement thereof, and means supporting said shock absorber piston rod at said sleeve means, means for effectively closing off the shock-absorber cylinder portion between said shock-absorber piston means and the portion of said tubular means disposed thereabove including a plug member seated against a collar in said tubular means, and threaded means removably securing said plug member in the assembled position thereof in which it rests against said collar.

5. An individual wheel suspension for vehicles, particularly motor vehicles provided with spindle means for supporting thereon the vehicle wheel and with a relatively stationary vehicle part, comprising essentially transversely extending guide means for guidingly securing said axle spindle means at said relatively stationary part, tubular means secured to said axle spindle means, shock-absorber piston means slidingly arranged within said tubular means and including a shock-absorber piston rod, and means providing a sliding surface for slidingly guiding the shock absorber formed by said tubular means and said piston means with respect to said relatively stationary vehicle part including sleeve means surrounding said tubular means, means securing said sleeve means at said relatively stationary vehicle part to provide a universal movement thereof within the region of said sliding surface, means supporting said shock-absorber piston rod at said one end of said sleeve means, said means for securing said sleeve means at said relatively stationary part being disposed adjacent the other end of said sleeve means.

References Cited in the file of this patent

UNITED STATES PATENTS

| | | |
|---|---|---|
| 1,711,881 | Fornaca | May 7, 1929 |
| 2,047,336 | Stout | July 14, 1936 |
| 2,793,048 | Adloff | May 21, 1957 |
| 2,856,198 | Muller | Oct. 14, 1958 |